United States Patent
Shin (10) Patent No.: US 6,424,835 B1
(45) Date of Patent: Jul. 23, 2002

(54) METHOD FOR CONTROLLING CALL IN COMMUNICATION SYSTEM OR TERMINAL

(75) Inventor: Yeong Jong Shin, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,186

(22) Filed: Dec. 30, 1998

(30) Foreign Application Priority Data

Aug. 12, 1998 (KR) ............................................ 98/32786

(51) Int. Cl.[7] ................................................ H04Q 7/20
(52) U.S. Cl. ........................ 455/445; 455/517; 455/567
(58) Field of Search ................................ 455/517, 567, 455/445

(56) References Cited

U.S. PATENT DOCUMENTS

| | | | | |
|---|---|---|---|---|
| 5,117,450 A | * | 5/1992 | Joglekar | 379/58 |
| 5,953,676 A | * | 9/1999 | Berry | 455/564 |
| 5,983,117 A | * | 11/1999 | Sandler | 455/557 |
| 6,052,578 A | * | 4/2000 | McWeeny | 455/414 |

* cited by examiner

*Primary Examiner*—Vivian Chang
*Assistant Examiner*—James Moore
(74) *Attorney, Agent, or Firm*—Fleshner & Kim, LLP (57) ABSTRACT

Method for controlling a call in a communication system or a communication terminal, including the steps of (1) monitoring use of a terminal by a user, (2) generating a dial tone in the terminal itself when the terminal is in use and stopping generation of the dial tone when a first information from a user dialing is received, (3) setting up a radio traffic channel based on a preset protocol between the terminal and a base station, (4) storing an entire information from the dialing in a memory in the terminal during the radio traffic channel set up, and (5) transmitting dialing information stored in the memory up to that time in a form of a continuation message through the channel upon setting up of the radio traffic channel.

29 Claims, 10 Drawing Sheets

| FIELD | LENGTH(BITS) |
|---|---|
| MSG_TYPE('00001001') | 8 |
| ACK_SEQ | 3 |
| MSG_SEQ | 3 |
| ACK_REQ | 1 |
| ENCRYPTION | 2 |
| DIGIT_MODE | 1 |
| NUM_FIELDS | 8 |

MUM_FIELDS OCCURRENCES OF THE FOLLOWING FIELD:

| CHARI | 4 OR 8 |
|---|---|

ZERO OR MORE OCCURRENCES OF THE FOLLOWING RECORD:

| RECORD TYPE | 8 |
|---|---|
| RECORD_LEN | 8 |
| TYPE-SPECIFIC FIELDS | 8 x RECORD_LEN |

| MORE FIELDS | 1 |
|---|---|
| RESERVED | 0-7(AS NEEDED) |

FIG.7

| FIELD | LENGTH(BITS) |
|---|---|
| MSG_TYPE('00001001') | 8 |
| ACK_SEQ | 3 |
| MSG_SEQ | 3 |
| ACK_REQ | 1 |

METHOD FOR CONTROLLING CALL IN COMMUNICATION SYSTEM OR TERMINAL

BACKGROUND OF THE INVENTION

1. Field of the Invention

The present invention relates to a method for controlling a call in a communication system.

2. Discussion of the Related Art

In CDMA (Code Division Multiple Access) call processing methods, there are generally two methods for transmitting a dialed number to a system (or BTS =base transceiver subsystem) when a user makes a call. Specifically, there are an en-bloc or functional address signaling method, and an overlap or stimulus address signaling method.

In the enbloc address signaling, a station is provided with a processor for processing a portion of call processing function for itself without help from a communication network. This signaling method is used in ISDN's or mobile communication networks of recently developed communication service networks. Using this method, the station stores information regarding a number dialed by a user applied and transmits the stored information at a time when the user presses a "send" button. In other words, the en-bloc address signaling is a signaling method in which the address digits are assembled into one block for onward transmission, the block containing all of the address information necessary to route the call to its destination.

In the overlap address signaling, a call is processed under the control of a switchboard without any processing function of its own. In this signaling, when the user lifts a receiver, the switchboard senses this and transmits a dial tone. Then, when the user dials, the switchboard senses every dialed number and controls the call. That is, the overlap address signaling is a signaling method in which the onward transmission of address of address signals from a mobile switching center may commence before the reception of all the address signals over the preceding link has been completed. This method is similar to that of a PSTN. En-bloc address signaling is more efficient to transmit the address signal, but in this signaling a calling user is required to input the "send" button as above mentioned.

Figure 1:
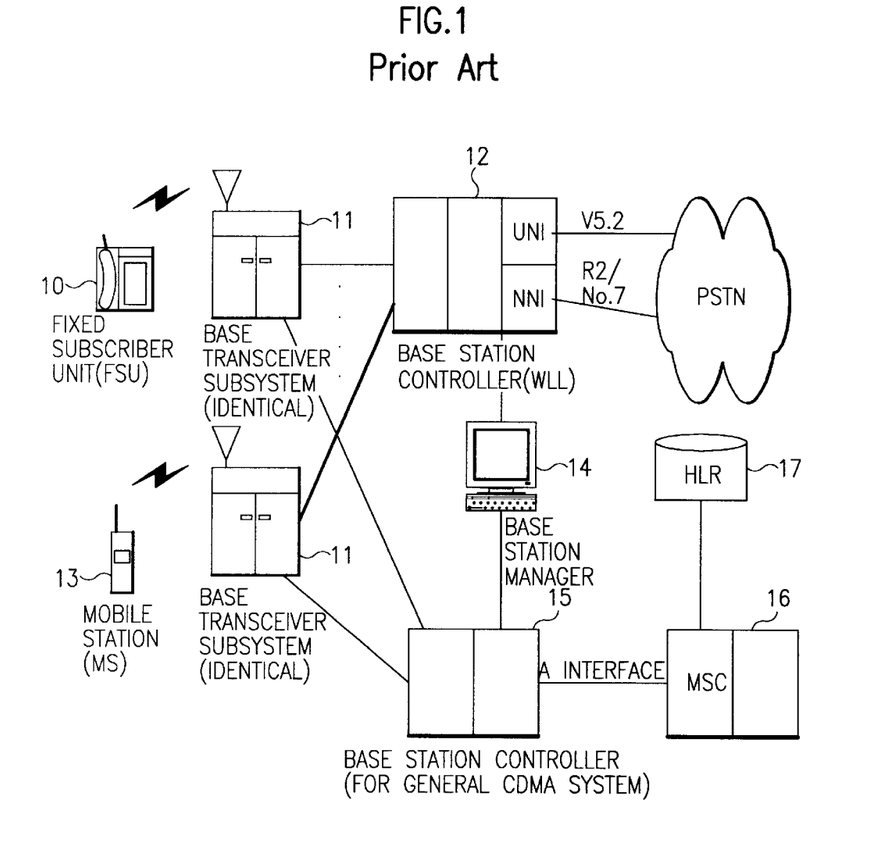
FIG. 1 illustrates a related art WLL-CDMA communication system.

The call control between a mobile station and a BTS in a CDMA mobile communication system is conducted according to an en-bloc address signaling defined in standards of EIA/TIA IS-95 and ANSI J-STD-008. FIG. 1 illustrates a WLL-CDMA mobile communication system.

Referring to FIG. 1, a WLL (Wireless Local Loop) system is provided with FSUs (Fixed Subscriber Units) 10, BTSs 11, and a WLL BSC (Base Station Controller) 12. A CDMA system is provided with FSUs 10, mobile stations, BTSs 11, a base station manager 14, a CDMA BSC 15, a mobile switching center (MSC) 16, and an HLR (Home Location Register) 17. The FSU 10 corresponds to the mobile station of a radio station, and the STS 11 is a radio interface connecting the mobile station and the BSC 12. The BSC 12 controls the BTSs 11, processes vocoding of a voice packet, and conducts an interfacing function in which the mobile station subscriber is connected to a PSTN. Particularly, the BSC 12 or 15 accommodates a plurality of BTSs 11. A radio communication is made between the BTS 11 and the mobile station 13 until a time when a radio traffic channel is set up. However, once the radio traffic channel is set up, radio communication is made between the mobile station 13 and the BSC 12 or 15. In order to explain a signal processing procedure to/from the mobile station 13, in general, the BSCs 12 and 15 and the BTS is called as a base station (BS), collectively. The BSCs 12 and 15 are connected to a BSM (Base Station Manager) 14 for system management and maintenance. And, as shown in FIG. 1, the CDMA system is further provided with a MSC 16 for number interpretation and switching and an HLR 17 for location management of the mobile stations 13.

Figure 2:
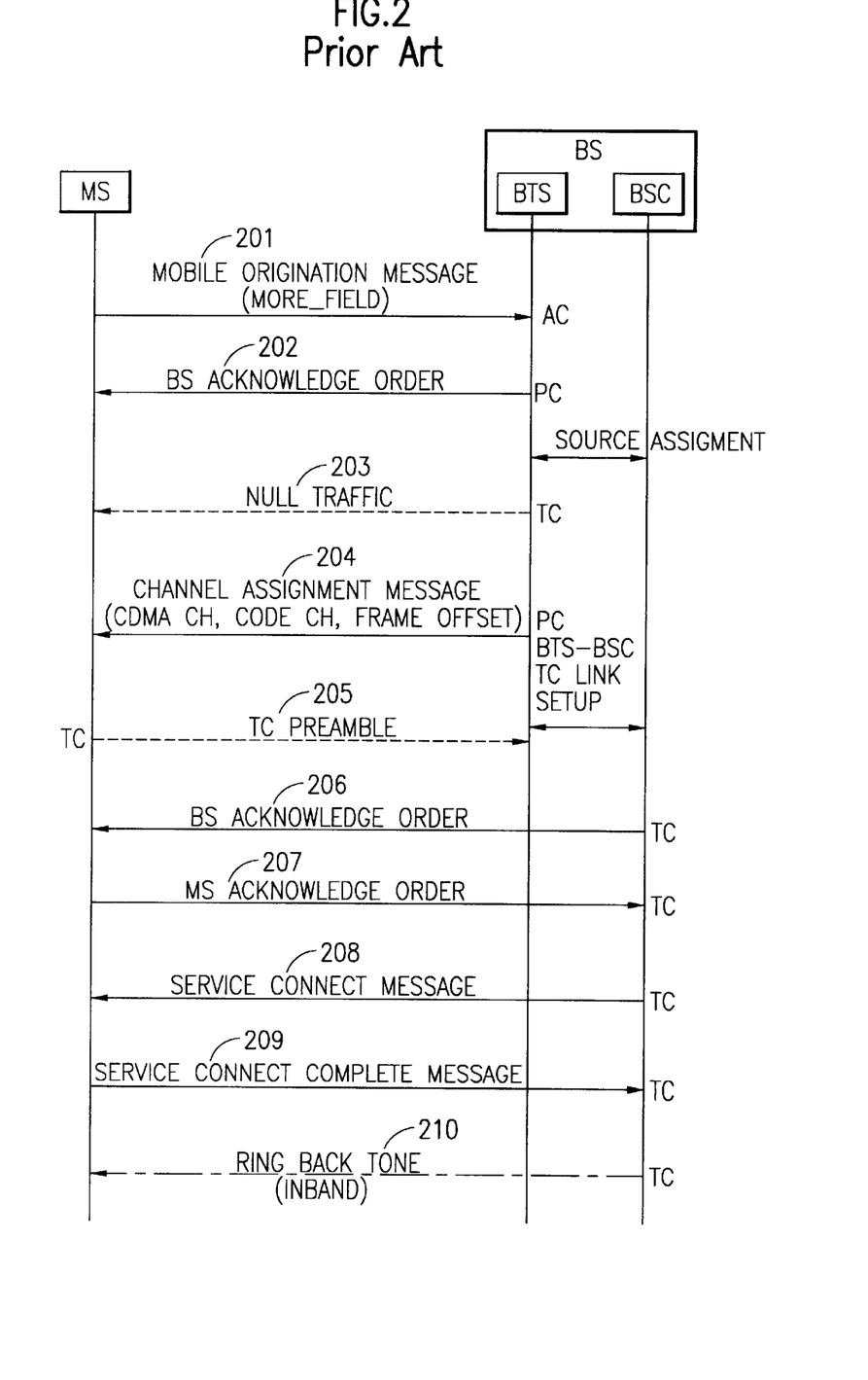
FIG. 2 illustrates a diagram showing a protocol between a mobile station and a base station in a CDMA communication system.

FIG. 2 illustrates a standard procedure for processing a call between a mobile station (MS) and a base station (BS) defined in a CDMA system standard. The standard procedure for processing a call between the MS and the BS is as follows. When a mobile station 13 transmits a mobile origination message containing all numerals dialed by a user toward the BS through an AC (Access Channel), which is a reverse channel (201), the BS transmits a BS acknowledge order for the mobile origination message toward the MS through a PC (Paging Channel), which is an forward channel (202). That is, the mobile origination message is a signal for requesting an initiation of a call, and the BS acknowledge message is a message informing an orderly reception of the mobile origination message.

Then, radio sources required for processing the call are assigned between the BTS and the BSC in the BS. Then, a null traffic signal is transmitted from the BTS toward the MS through the traffic channel which is an assigned forward channel (203), for informing an availability of the assigned traffic channel. A channel assignment message containing all assignment information is provided from the BTS in the BS toward the MS through the paging channel (204). The channel assignment message contains a CDMA channel of the assigned 1.25 MHz band frequency, a code channel of radio traffic channel, and frame offset information to match a synchronization for load spreading, and etc. Then, a traffic channel (TC) link is set up between the BTS and the BSC in the BS. Then, the MS provides a traffic channel preamble signal, a preliminary signal, to the BTS in the BS through the traffic channel to the BTS assigned according to the channel assignment message (205). As explained, since there is the TC link set up between the BTS and BSC, the BSC provides a BS acknowledge order to the MS through a forward traffic channel in response to the TC preamble (206), and the terminal, i.e., the MS, acknowledging the forward traffic channel, provides an MS acknowledge order which permits to acknowledge an reverse traffic channel to the BSC (206).

After recognition of such data, the BTS and BSC transmit a responsive signal (207). Thus, both a forward traffic channel and a reverse traffic channel are set up between the MS and the BSC. Then, the BSC in the base station provides a service connect message, informing a requested service is available, to the MS (208), and, in response to the service connect message, the MS provides a service connect complete message which acknowledges the service connect message to the BSC (209). In this instance, the MSC provides a ring back tone to the MS through the BSC (210). As has been explained, a traffic channel is set up through a procedure of confirming service options between the MS and the BS, and the MS receives a ring back tone over the traffic channel.

As shown in FIG. 1, the FSU 10 in a related art WLL-CDMA communication system is provided with a "send" button for processing a call in en-bloc address signaling method identical to a general CDMA communication system. When a user lifts a transceiver and dials, the FSU 10 stores the number dialed by the user, and starts to provide the stored number to abase station at a time when the "send" button is pressed by the user. On reception of the number, the BS controls the call in interface with the BSCs 12 and 15 and the MSC 16 using the aforementioned standard procedure between the MS and the BS. A related art WLL communication system is a PSTN in which a wireline telephone system is replaced. Therefore, users in the related art WLL system use terminals in the same way as the terminals used in the wireline telephone system. However, in a WLL-CDMA system, the en-bloc address signaling is used in processing a call between the related art FSU and the system. Therefore, a call set up is started when the user presses a "send" button after the user in the WLL-CDMA communication system finishes dialing of all the numerals or after a preset time period elapses.

The WLL system is a communication system employed by users who need to make a fast communication between people working in a limited area like airport guards. Therefore, the en-bloc address signaling method employed in the WLL-CDMA system is not convenient in that the user must wait for the call set up. It is expected that the CDMA 2000 system will be used for the WLL system operation, and therefore should support the wireline service and wireline equipment access through appropriate terminations. The wireline equipment is called the aforementioned FSU. However, the related art WLL-CDMA communication system is not convenient in that the "send" button must be pressed as the WLL-CDMA communication system employs the en-bloc address signaling method.

SUMMARY OF THE INVENTION

Accordingly, the present invention is directed to a method for controlling a call in a communication system that substantially obviates one or more of the problems due to limitations and disadvantages of the related art.

An object of the present invention is to provide a method for controlling a call in a communication system, in which the call can be made without pressing a "send" button in a call between a terminal and a base station.

Another object of the present invention is to provide a method for controlling a call in a communication system, in which the existing overlap address signaling can be employed in a radio communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the communication terminal monitors on/off state of a hook switch. If the hook switch is at off, the terminal generates a dial tone within itself; and monitors generation of information on a number dialed by a user. Upon generation of the first information on the dialed number, the terminal stops generation of the dial tone. And, the terminal conducts a previous operation as well as sets up a radio traffic channel with a base station based on a preset protocol. The information of the dialed number is stored in a memory in the terminal during conducting the foregoing process. Upon setting up of the channel, the terminal builds up the stored information into a form of message, and transmits to the base station. As the present invention employs the overlap address signaling, overlapped sending of the messages are possible. That is, after the radio traffic channel set up, the information of a number dialed by the user is built up in the same form of message after sending the information already stored, and transmitted to the base station in preset units. Since the present invention applies the overlap address signaling to the CDMA communication system and the WLL-CDMA communication system, a "send" button is required no more, which is required in the case of en-bloc address signaling application. The same effect as a wireline communication system can be obtained out of a radio mobile communication system, and a call setting time can be shortened because the terminal is not required to recognize the last digit, and, furthermore, and the present invention is favorable in application to a WLL-CDMA communication system which requires a wireline communication system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 3:
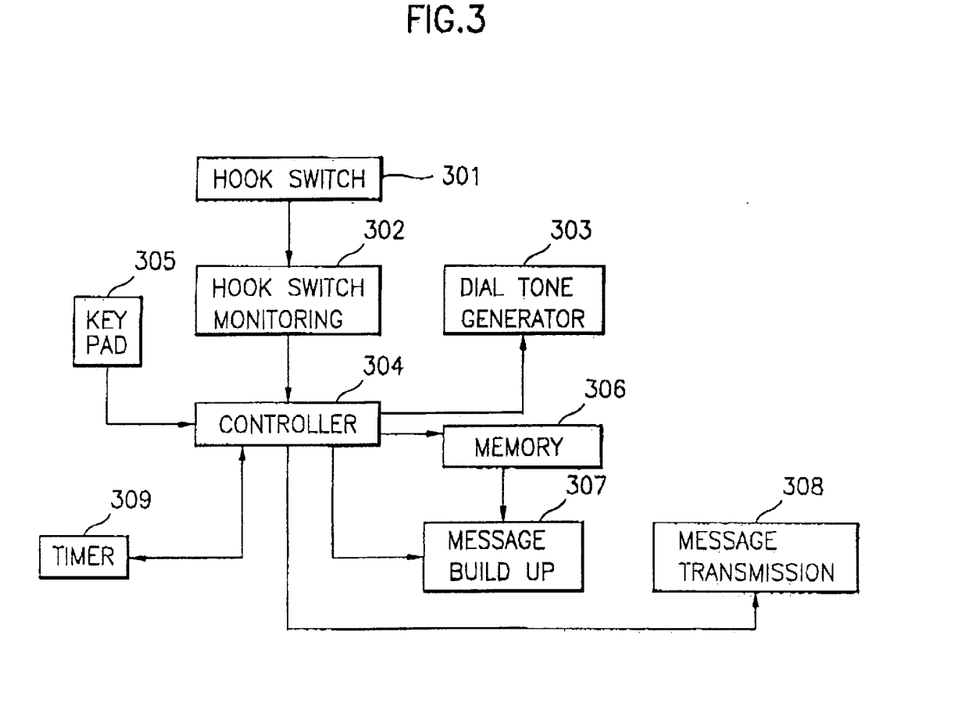
FIG. 3 illustrates a block diagram of a system of a mobile station in accordance with a preferred embodiment of the present invention.

Reference will now be made in detail to the preferred embodiments of the present ins invention, examples of which are illustrated in the accompanying drawings. The method for controlling a call in a communication system of the present invention is applicable to all radio communication systems, such as a CDMA-WLL communication systems, as well as a general CDMA mobile communication system. The present invention considers the overlap address signaling in CDMA system to support WLL subscribers using the fixed subscriber unit. As in the PSTN, in the WLL system, it is undesirable to use the send button when dialing. In order that the wireline subscribers will be free from pressing the send button as in the PSTN the overlap address signaling should be supported in communication systems including the CDMA communication. The overlap address signaling is a signaling method in which the forward transmission of address signals may commence before the reception of all the address signals from the mobile station. FIG. 3 illustrates a block diagram of a system of a mobile station in accordance with a preferred embodiment of the present invention.

Referring to FIG. 3, the mobile station includes a hook switch 301, a hook switch monitoring section 302, a dial tone generator 303, a controller 304, a key pad 305, a memory 306, a message build up section 307, and a message transmission section 308. The hook switch 301, switched on normally, is switched off when the mobile station is used by the user. The hook switch monitoring section 302 monitors a state of the hook switch 301 and informs an off state of the hook switch 301 to the controller 304. The controller 304 provides a control signal to a dial tone generator upon sensing the off hook state through the hook switch monitoring section. The dial tone generator 303 generates a dial tone within the mobile station itself in response to the control signal.

When a user dials a telephone number on a keypad 305 while the mobile station is turned on, to generate a first digit, the controller 304 provides another control signal to the dial tone generator 303 to stop generation of the dial tone. The controller 304 transmits/receives messages required for a radio traffic channel set up to/from the base station through the message transmission section 308. Digits generated in the keypad 305 by user's dialing during the traffic channel set up are stored in the memory 306 under the control of the controller 304. Upon completion of the traffic channel set up, the message build up section 307 builds up a message out of the telephone number digits stored in the memory 306 up to that time under the control of the controller 304 and provides to the message transmission section 308. The message transmission section 308 provides the message to the base station in a form of a radio signal.

If there are digits of additional telephone numbers dialed by the user after the traffic channel set up, the digits are built up in an identical form of message in the message build up section 307 under the control of the controller 304 and provided to the message transmission section 308 after the message corresponding to the already stored digits is sent. The message transmission section 308 transmits the message to the base station also under the control of the controller 304. As an overlap address signaling is employed in the present invention, the digits received through the keypad 305 after the message of the already stored digits is sent is converted into a message number by number before transmission to the base station.

In the meantime, a timer 309 is provided for counting a maximum time period for transmission of messages of the telephone number received after the traffic channel set up to the base station. That is, the timer 309 counts a maximum time for the mobile station to send an origination continuation message upon entering the overlap sending substate of the mobile station control on the traffic channel state. The timer 309 also counts a maximum time to receive a message in the overlap sending substate of the mobile station control on the traffic channel state that transits the mobile station to a different substate or state. Such a time limits will be explained later in detail.

Figure 4:
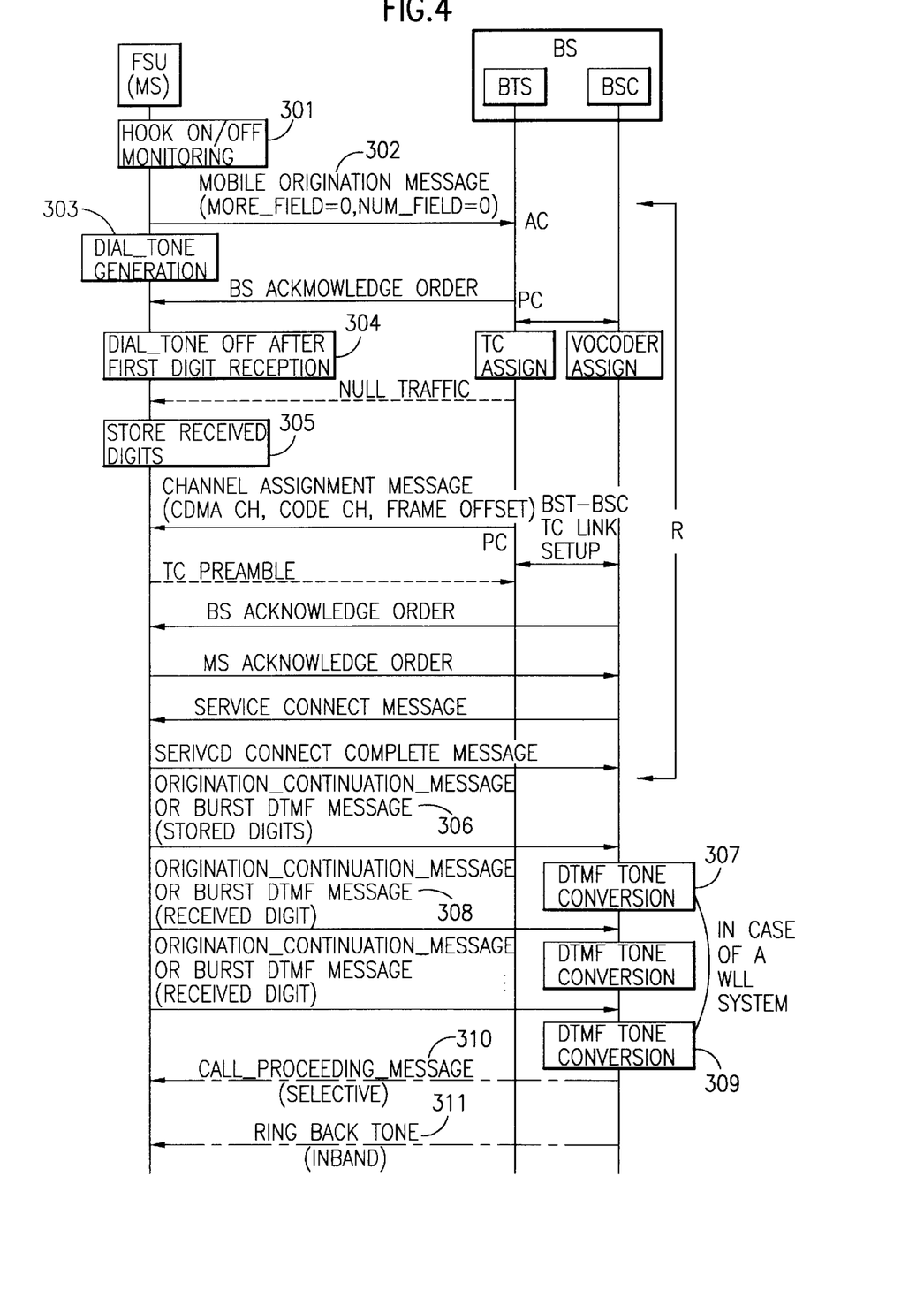
FIG. 4 illustrates a protocol diagram of a process for controlling a call between a mobile station and a base station in accordance with a preferred embodiment of the present invention.

A method for controlling a call between a mobile station and a base station in accordance with a preferred embodiment of the present invention will be explained with reference to FIG. 4. FIG. 4 illustrates a protocol diagram of a process for controlling a call between a mobile station and a base station in accordance with a preferred embodiment of the present invention. Communication systems to which the method of the present invention can be applied will be explained further before starting explanation of the present invention.

Herein, a terminal may be either the mobile station or the fixed subscriber unit (FSU) in the CDMA-WLL communication system shown in FIG. 1. The FSU is a device which serves the same function as a general telephone, and a terminal in a CDMA communication system is a mobile station. Therefore, as shown in FIG. 3, the terminal, provided with a microprocessor (or controller), monitors an on/off state of a hook switch and generates a dial tone within itself. The terminal processes a protocol between the terminal and the base station according to a standard such as IS-95/J-STD 008. The FSU can be either an SSU (Single Subscriber Unit) which contains one telephone within its own system or a MSU (Multiple Subscriber Unit) to which many telephone units can be connected. Both forms of the FSU are applicable to the method of the present invention. Therefore, the method of the present invention can accommodates any kind of FSU, not only in a WLL communication system, but also in a general WLL-CDMA communication system.

Being a system for making a radio interface between a terminal and a BSC, a BTS processes a radio analog signal to modulate/demodulate and channel coding/decoding a radio signal, The BTS in the present invention is identical to the BTS in the related art shown in FIG. 1. In the WLL communication system, the BSC manages and controls a plurality of BTSs, vocodes a voice packet, keeps hold of locations of FSUs and registers the locations, and interfaces with a PSTN. In the interface with the PSTN, interfaces between networks, such as R2 and No. 7 protocol, can be employed, and in the interface between a network and an FSU, a V5.2 protocol is used, mostly. A protocol for a WLL communication system used mostly is V5.2 protocol. When FSUs are included in a general CDMA mobile communication system, number interpretation and switching are not relied on a switching station in the PSTN, but done by a MSC. Therefore, the method of the present invention is applicable to a WLL communication system and a general CDMA communication system irrespective of kind of interface between an FSU and BTS or BSC.

The process for controlling a call according to a protocol of the present invention will be explained with reference to FIG. 4. A call control process of a preferred embodiment of the present invention is carried out under a close control procedure between a terminal (for example, an FSU or a mobile station) and a BTS or a terminal and a BSC. In all procedures between the terminal and the BS, only messages defined in a standard are used for compatibility purposes, as shown in FIGS. 2 and 4. First, a terminal (MS or FSU) provides "dial tone" by itself when it detects user's "hook-off" (301 ~303). "Dial tone" is continuously provided until a first digit is given by user's dialing through a key pad. Next, once the first digit is given by user's dialing, the terminal removes "dial tone" (304) and send an origination message with "More-Fields =1". Then, a radio traffic link set up procedure is performed according to a standard procedure such as 95b and 95C.

While performing the traffic channel setup procedure after sending the origination message, the terminal stores in a memory all of digits which has been dialed by user (305).

Explanation of the radio traffic channel set up procedure between the terminal and the base station will be omitted, as the set up procedure is identical to a protocol procedure for an existing CDMA communication system. Next, the terminal enters the overlap sending substate when the traffic channel set up procedure is completed. The overlap sending substate does not exist in the current 95B and 95C.

Once the traffic channel step set up is completed, the terminal builds an origination continuation message with the dialed digits, which has been stored in the memory so far (306). Next, the origination continuation message would be resent separately until the end of user's dialing (308). If the terminal is aware of the completion of the user's dialing, the terminal sends an origination continuation message with "More-Field=0". How to determine whether the user's dialing is completed is left to the terminal manufacturer. Then, the base station determines that it has received sufficient calling information from the terminal through the network, the base station sends a call proceeding message (310) to indicate that the requested call establishment has been initiated in the network and no more call establishment information will be accepted. Upon receipt of the call proceeding message from the base station, the terminal stops sending the origination continuation message and discard additional digits directed by user to send. As a final step, the terminal enters the conversion substate.

Figure 5:
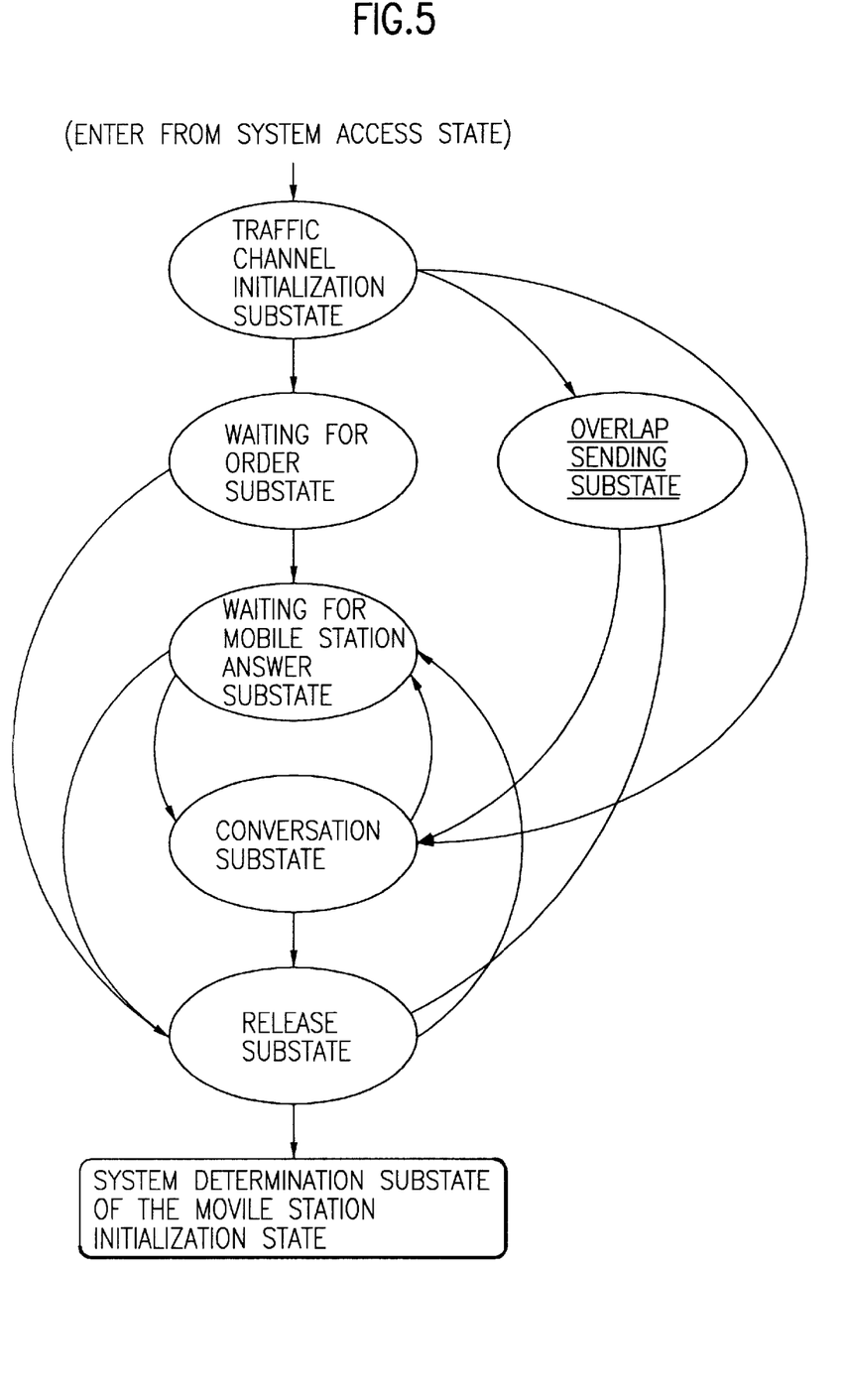
FIG. 5 illustrates a diagram for showing substate-states in accordance with the control of the terminal on the traffic channel state.

A relation between substates (or stages) corresponding to operation of terminals in a traffic channel state after the traffic channel set up between the terminal and the base station will be briefly described. FIG. 5 illustrates a diagram for showing substate-states in accordance with the control of the terminal on the traffic channel state.

Referring to FIG. 5, the terminal is at an origination attempt substate before a traffic channel state shown in FIG. 5. In this substate, the terminal sends an origination message. If the base station responds to the origination message with an authentication request, the terminal responds in this substate. As the present invention uses the overlap address signaling, the terminal sets "OVERLAP ENABLEDs" to YES and sets the MORE-FIELD of the origination message to "1". The precise process for determining how to select the address signaling when the terminal is directed by the user to initiate a call is left to the terminal manufacturer. On the traffic channel state, the terminal communicates with the base station using the forward and reverse traffic channels. As shown in FIG. 5, the terminal control on the traffic channel state comprises the following six states; a traffic channel initialization substate, an overlap sending substate, a waiting for order substate, a waiting for terminal answer substate, a conversation substate, and a release substate.

In the traffic initialization substate, the terminal verifies that it can receive the forward traffic channel and begins transmitting on the reverse traffic channel. In this substate, if the call is terminal originated and the "OVERLAP ENABLEDs" is "NO", the terminal (mobile station) enters the conversation substate. If the call is the terminal originated and the "OVERLAP ENABLEDs" is "YES", the terminal enters the overlap sending substate. In the overlap sending substate, the terminal transmits all of the dialed digits directed by the user to the base station and waits for an calling proceeding message or additional information directed by the user. In the waiting for order substate, the terminal waits for an alert with information message. In the waiting for terminal answer substate, the terminal waits for the user to answer the call. In the conversation substate, the terminal exchanges traffic channel frames with the base station in accordance with the current service configuration. In the release substate, the terminal disconnects the call.

The traffic channel initialization substate is changed to the waiting for order substate when the terminal terminated a calling and receives a base station acknowledgment order on the forward traffic channel, to the overlap sending substate when the terminal originates a call using the overlap addressing and the terminal receives a base station acknowledgment order on the forward traffic channel, and to the conversation substate when the terminal originated a call and receives abase station acknowledgment order on the forward traffic channel. The traffic channel initialization substate is also changed to the conversation substate when the terminal terminated a call or a bypass ordered by the base station and the terminal receives a base station acknowledgment order on the forward traffic channel. The waiting for order substate is changed to the waiting for terminal answer substate when the terminal receives a maintenance order or an alert with information message, and to the release substate when the terminal receives a release order.

The overlap sending substate is changed to the conversation substate when the user ends a dialing or when the terminal receives a call proceeding message on the forward traffic channel, and to the release substate when the terminal receives a release order. The waiting for terminal answer substate is changed to the conversation substate when the terminal user answers a call, and to the release substate when the terminal receives a release order. The conversation substate is changed to the waiting for terminal answer substate when the terminal receives a maintenance order or an alert with information message, and to the release substate when the terminal user initiates disconnection or the terminal receives a release order. The release substate is changed to the waiting for terminal answer substate when the terminal receives an alert with information message. Finally, the terminal performs a system determination substate of terminal initialization state.

The overlap sending substate will be further described.

Upon entering the overlap sending substate, the terminal sets the substate timer for T74 m seconds (for example, 5 seconds). The above T74 m means a maximum time to receive a message in the overlap sending substate of the terminal (mobile station) control on the traffic channel state that transits the terminal to a different substate or state. If the substate timer expires, the terminal sends an origination continuation message with MORE FIELD set to "0" and enters the conversation substate. As above mentioned, the terminal sends an origination continuation message as a message requiring acknowledgment within T54 m seconds (0.2 second) after entering the overlap sending substate if the terminal originated the call and did not send all the dialed digits in the origination message or there is more than one calling party number associated with the terminal or a calling party subaddress is used in the call or a called party subaddress is used in the call. The above T54 m means a maximum time for the mobile station to send an origination continuation message upon entering the overlap sending substate of the terminal control on the traffic channel state.

If more than one calling party number is associated with the terminal, the terminal includes the calling party number being used in the calling party number information record in the origination continuation message. If only one calling party number is associated with the terminal, the terminal does not include the calling party number information record in the origination continuation message. If a calling party subaddress is used, the terminal includes the calling party subaddress information record in the origination continuation message. Otherwise, the terminal omits the calling patty subaddress information record. If the terminal is directed by the user to transmit additional call information under determination that the user's dialing is not completed yet, the terminal (mobile station) sends an origination continuation message with MORE_FIELDS set to "1". After sending the origination continuation message, the terminal resets the substate timer for T74 m seconds. If the terminal determines that the user's dialing is completed, the terminal sends an origination continuation message with MORE-FIELDS set to "0" and enters the conversation substate.

Figure 6:
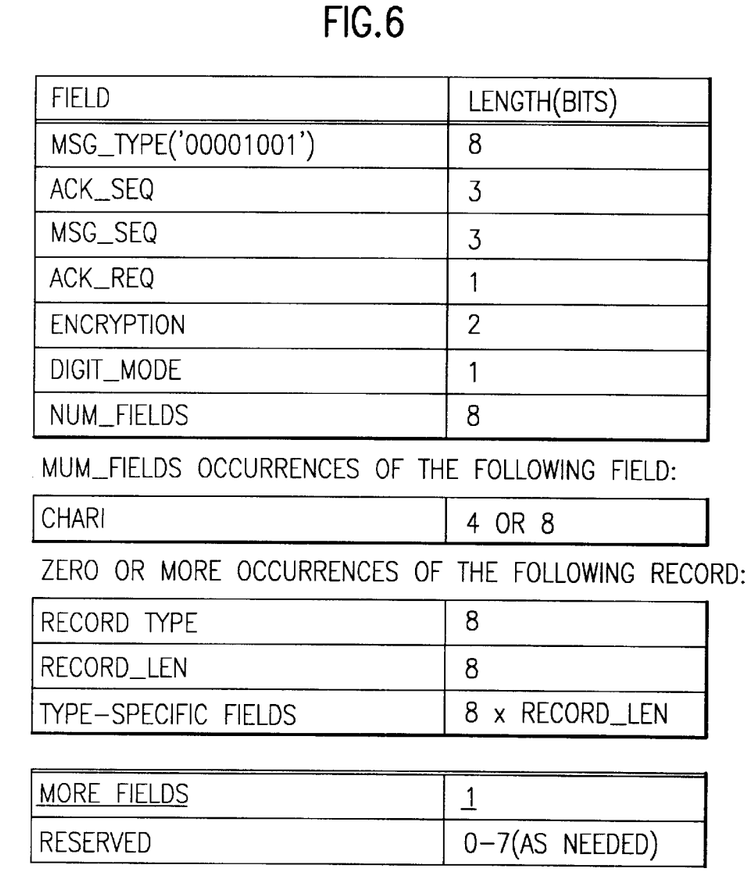
FIG. 6 illustrates a table showing a variable-length message format when the terminal sends an origination continuation message.

The origination continuation message will be further described. The above MORE_FIELDS is added to the origination continuation message for the terminal to send the origination continuation message more than once, FIG. 6 illustrates a table showing a variable-length message format when the terminal sends an origination continuation message.

Referring to Figure G, MSG-TYPE means a message type. The terminal sets this field to "00001001". ACK-SEQ means an acknowledgment sequence number. MSG-SEQ means a message sequence number. ACK-REQ means an acknowledgment required indicator. ENCRYPTION means a message encryption indicator. DIGIT-MODE means a digit mode indicator. NUM-FIELDS means a number of the dialed digits in this message. The terminal sets this field to the number of dialed digits included in this message. CHARi means a dialed digit or character. RECORD-TYPE means an information record type. RECORD-LEN means an information record length. The terminal sets this field to the number of octets in the type-specific fields included in this record. Type-specific fields means type specific fields in itself. MORE_FIELDS means a more dialed digits indicator. This field indicates whether additional dialed digits will be sent to the base station in a later origination continuation message. If all dialed digits fits into this message, the terminal shall set this field to "0". If not, the mobile station shall set this field to "1". RESERVED means reserved bits. The terminal adds reserved bits as needed in order to make the length of the entire message equal to an integer number of octets. The terminal sets these bits to "0".

Figure 7:
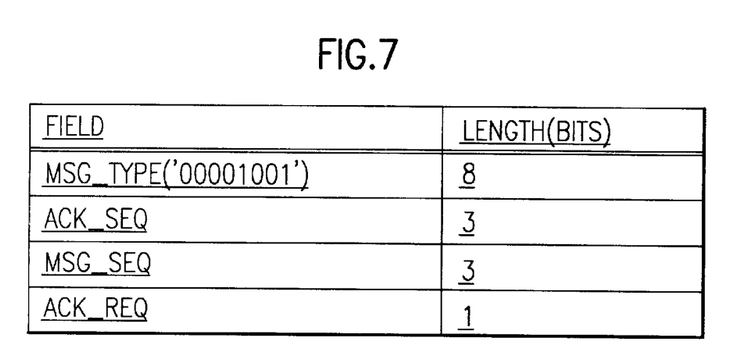
FIG. 7 illustrates a table showing a fixed-length message format of the call proceeding message.

FIG. 7 illustrates a table showing a fixed-length message format of the call proceeding message.

Referring to FIG. 7, MSG TYPE means a message type. The base station sets this field to "00100000". ACK SEQ means an acknowledgment sequence number. MSG SEQ means a message sequence number. ACK REQ means an acknowledgment required indicator.

Figure 8A:
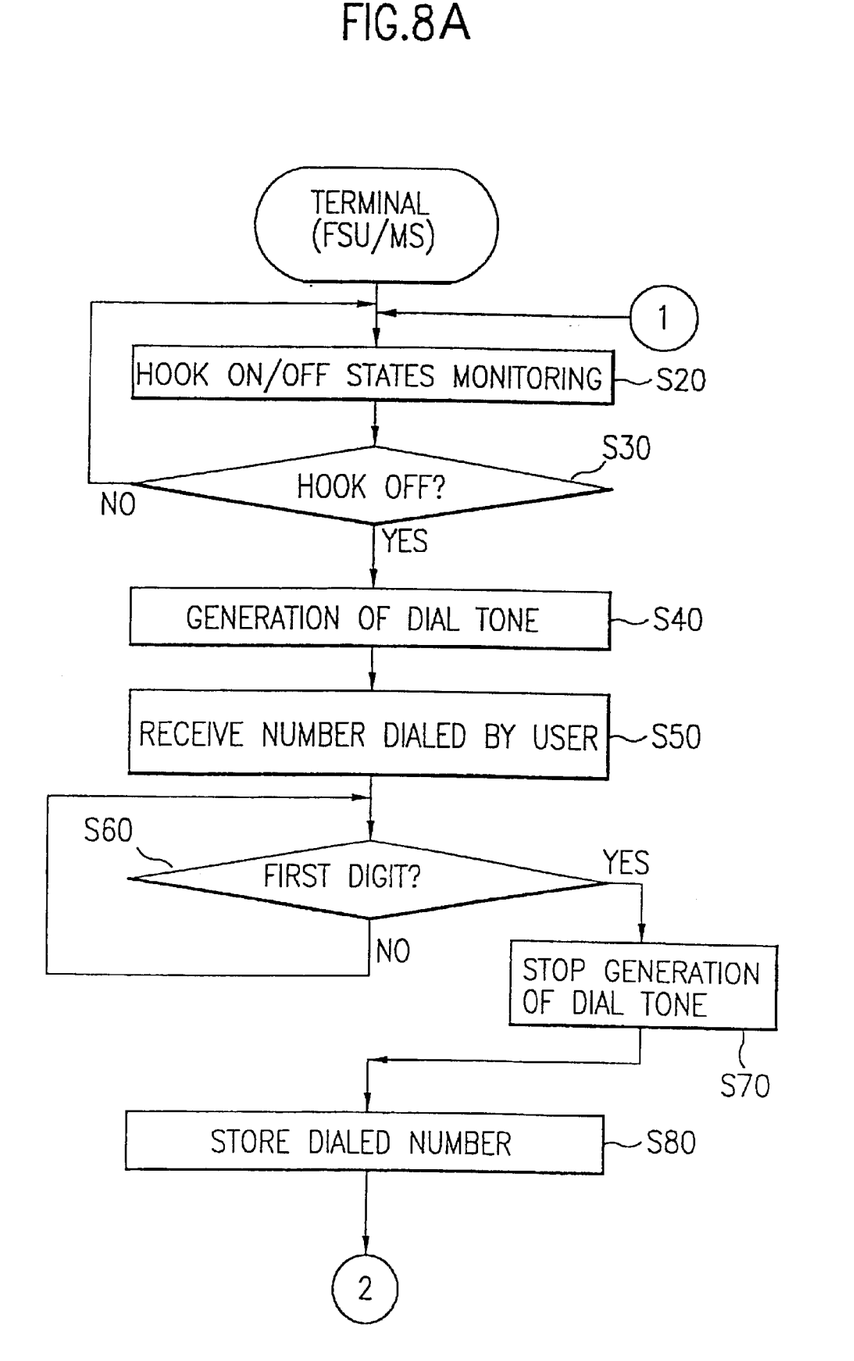
FIG. 8 illustrates a flow chart showing operation of a terminal of the present invention; and, FIG. 9 illustrates a flow chart showing operation of a base station (BTS and BSC) of the present invention.
Figure 8B:
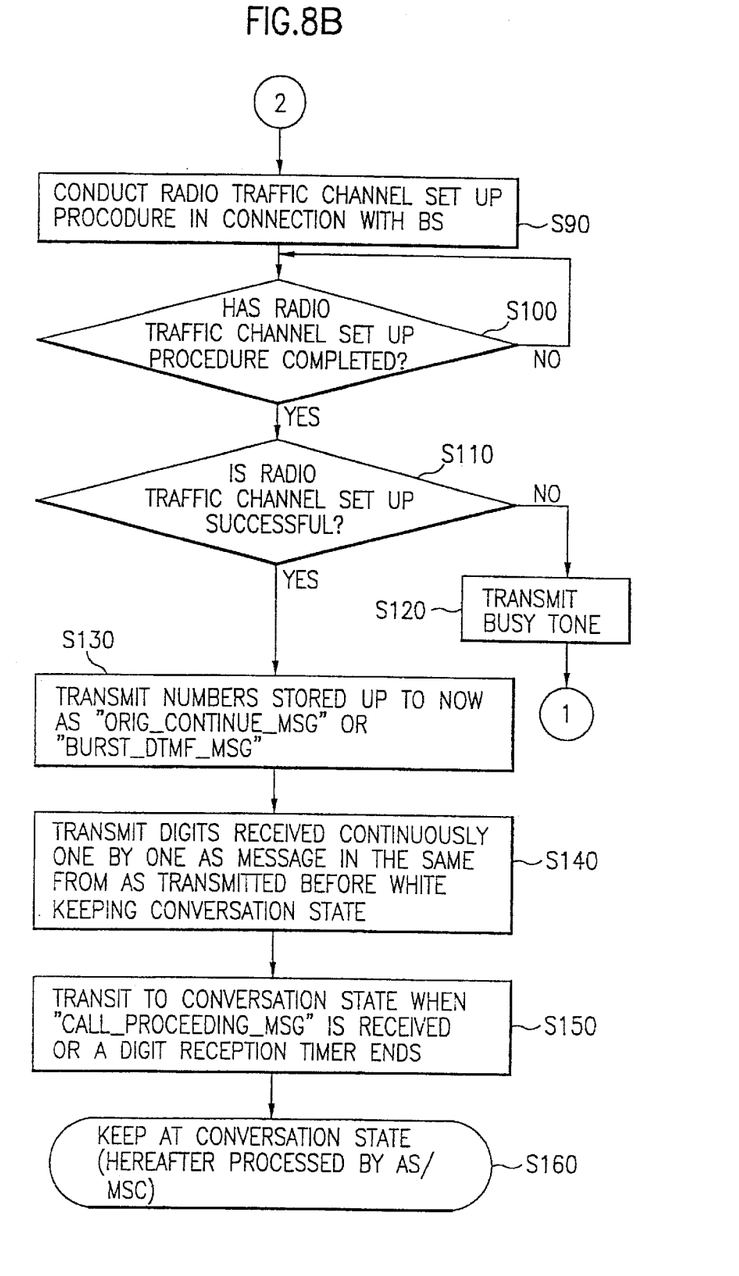

The operation of the terminal (MS or FSU) of the present invention will be explained with reference to FIG. 8. FIG. 8 illustrates a flow chart showing operation of a terminal of the present invention.

Referring to FIG. 8, the terminal monitors use of its receiver by a user (i.e., on/off of a hook switch) (S20). When the hook switch is turned off (S30), the terminal generates a dial tone in itself for dialing a telephone number in a natural form identical to a wireline subscriber (S40). When the user starts pressing buttons on the key pad, the terminal receives digits of the numerals (S50). Upon reception of a first digit of the dialed number (S60), the terminal stops generation of the dial tone in itself (S70) and stores received dialed digits in a memory (S80).

Then, the terminal carries out the radio traffic channel set up procedure shown in regions R in FIGS. 2 and 4 in connection with the base station (S90). If the radio traffic channel set up procedure is not successful (S10), the terminal generates a busy tone in itself (S120), and on/off of the hook switch is again monitored (S20). If the radio traffic channel set up procedure is successful (S10), digits of the dialed numerals stored up to the present time are transmitted to the BS through the traffic channel (S 130). In this instance, the terminal is kept at a busy state, and transmits digits provided by the user to the BS one by one (S130), The already stored digits are transmitted to the BS as "Origination-Continuation message" or "burst DTMF message." Digits of numerals dialed after the traffic channel set up are transmitted to the BS in a form identical to the "Origination-Continuation _message" or "Burst DTMF_message" used initially one by one, consistently (S140). If the terminal receives a "Call Proceeding message" from the BS or a timing of a timer therein comes to an end, the terminal transits to a busy state (S 150). All the digits provided by dialing of the user during the busy state are transmitted as "Burst DTMF_message" for control of additional services. The terminal is then kept on a busy state (S160). Thereafter, the call is processed between the BSC and the MSC in the same fashion as a call process in a case of wireline subscriber. In this instance, the terminal receives a ring back tone from the BTS.

Figure 9A:
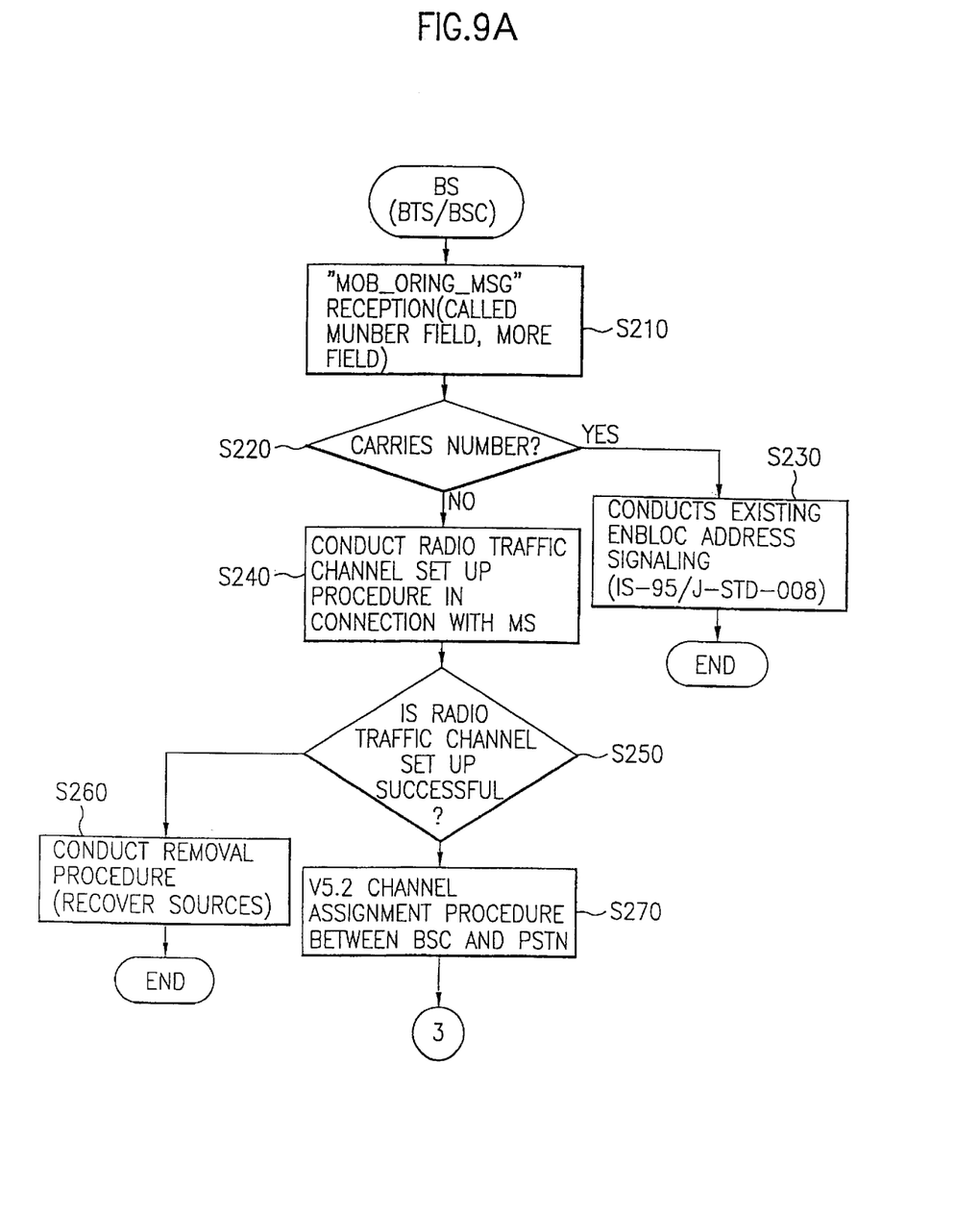
Figure 9B:
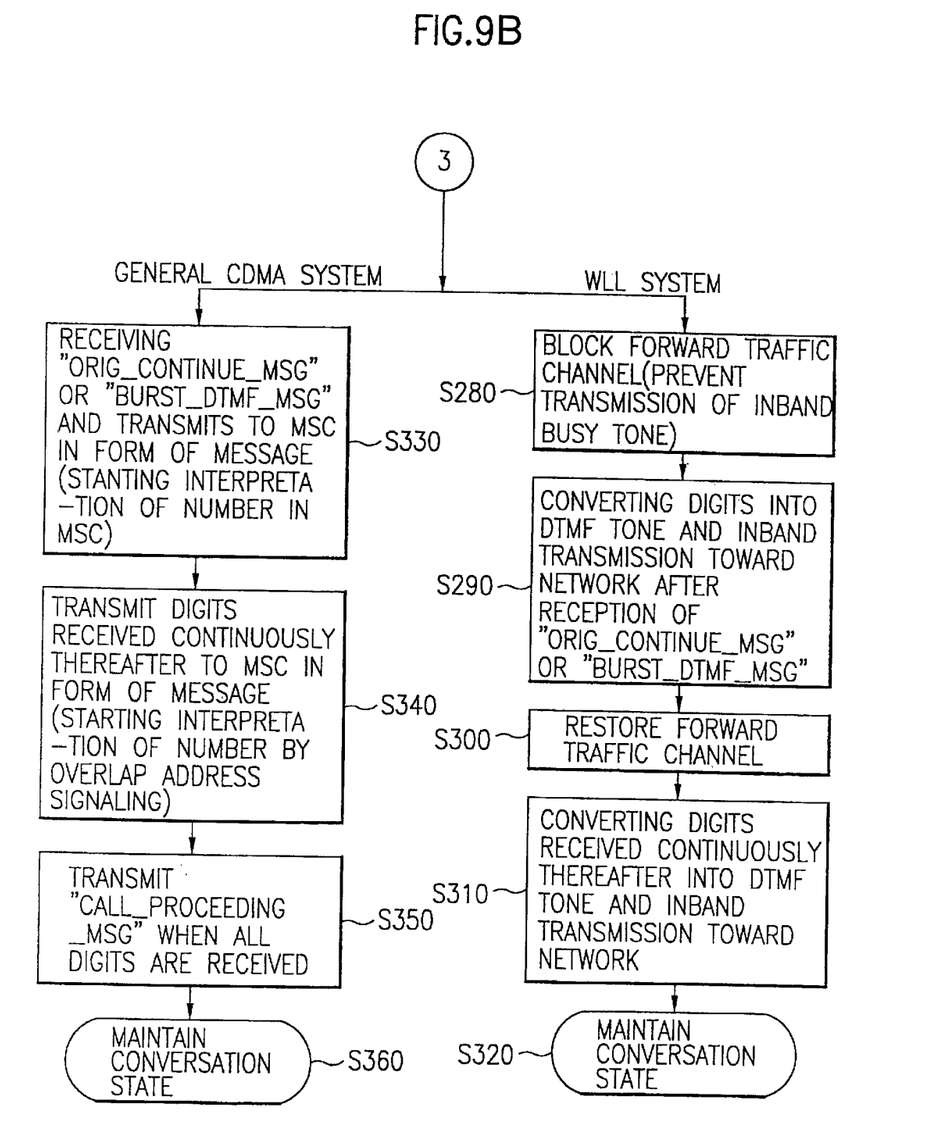

The operation of the base station (ETS and BSC) of the present invention is illustrated in a flow chart in FIG. 9.

As explained, according to the present invention, both the en-bloc address signaling method or the overlap address signaling method can be applicable to a terminal of the present invention either in a WLL communication system or a general CDMA mobile communication system. The base station waits for a "Mobile origination message" for a call establishment (S210). Presence of a dialed number in a received message is thus determined (S220). If the dialed number is present in the received message, the terminal carries out an existing en-bloc address signaling (S230). The en-bloc address signaling is carried out according to the IS-95 or J-STD-008 standard. If the dialed number is not present in the received "Mobile origination message", the terminal sets up radio traffic forward, and reverse channels between the terminal and the BS based on the aforementioned IS-95 or J-STD-008 (S240). In this instance, if the radio traffic channel is not set up (S250), the BS recovers all call information and stops all operation (S260). If the radio traffic is set up (S250), the WLL communication system carries out a channel assignment procedure in connection with a V5.2 protocol processing unit in the PSTN (S270). After the radio traffic channel setup, the BSC waits for "Origination-Continuation message" or "Burst DTMF_message" transmitted from the terminal. Thereafter, the calling differs depending on a form of a communication system.

First, in a case of a WLL, the BSC blocks the forward traffic channel temporarily for preventing duplicated "Busy tone" transmission to the FSU (S280). Then, upon reception of "Origination Continuation channel" or "Burst-DTMF-message" from the terminal, the BSC converts digits of dialed numerals carried on the "Origination Continuation channel" or "Burst DTMF message" into a DTMF tone one by one and inband transmits toward network one by one (S290). In this instance, the temporarily blocked forward traffic channel is restored (S300).

When digits of numerals dialed by the user are kept received through the "Origination Continuation channel" or "Burst DTMF message" after the traffic channel set up, the BSC converts the digits into a DTMF tone one by one and transmits toward the network (S310). Accordingly, an overlap address signaling is kept on between the user and the network. In this instance, transmission of digits from the terminal to the network should be consistent from the beginning to the end in a form initially used message. In this instance, the WLL-BSC is kept at a busy state (S320).

On the other hand, in a general CDMA mobile communication system, upon reception of the "Origination Continuation channel" or "Burst DTMF_message the BSC provides dialed digits carried on the message to an MSC in a form of message (S330). In this instance, the MSC starts a number interpretation by an overlap address method (S340). The "Origination Continuation channel" or "Burst-DTMF_message" received continuously thereafter are provided from the BSC to the MSC in forms of messages the same as the first time. This message transmission procedure should be consistent with messages identical to the message used initially. When the BSC is informed from the MSC that reception of the dialed number is satisfactory, the BSC can provide a "Call_Proceeding message" to the terminal (S350). All digits received through an FSU may be transmitted to the WLL-BSC all in forms of "Burst DTMF message" (S360). And, according to the present invention, even if the WLL communication system employs the R2 or No. 7 protocol which are a protocol of an NNI (Network-Network Interface) form other than the V5.2 protocol which is a protocol of UNI (User-Network Interface) form, a same protocol may be applied between the terminal and the BS as it is.

As has been explained, the method for controlling a call of the present invention has an advantage in that a call service identical to a general wireline telephone can be provided to users of FSU even in a CDMA-WLL communication system. And, regardless of kinds of terminal, a radio traffic channel can be set up between the terminal and the base station and a real time overlap call processing service can be provided between a user and a network. And, the method for controlling a call of the present invention has an advantage in that FSUs having no "send" buttons can be used together with MSs employing an existing en-bloc address signaling in a CDMA-WLL system. And, because a general CDMA mobile communication system is allowed to accommodates FSUs, an existing WLL communication system can be replaced.

It will be apparent to those skilled in the art that various modifications and variations can be made in the method for controlling a call in a communication system of the present invention without departing from the spirit or scope of the invention. Thus, it is intended that the present invention cover the modifications and variations of this invention provided they come within the scope of the appended claims and their equivalents.

What is claimed is:

1. A method for controlling a call in a communication system, comprising:
   (1) monitoring use of a terminal by a user;
   (2) generating a dial tone in a terminal when the terminal is in use and stopping generation of the dial tone when a first information from a user dialing is received;
   (3) setting up a radio traffic channel based on a prescribed protocol between the terminal and a base station;
   (4) storing information from the user dialing in a memory in the terminal during the radio traffic channel set up; and
   (5) transmitting the stored dialing information in a form of a first origination continuation message through the channel upon setting up of the radio traffic channel wherein the first origination continuation message comprises a NUM_FIELDS parameter indicating a number of dialed digits in the continuation message, a CHARi parameter indicating a dialed digit or character, and a MORE_FIELDS parameter indicating whether additional dialed digits will be sent in a subsequent origination continuation message.

2. The method as claimed in claim 1, further comprising checking a use starting state of the terminal if a busy tone is generated in the terminal if the radio traffic channel set up is not successful.

3. The method as claimed in claim 1, further comprising:
   building up the dialed information from the user in the form of a second continuation message after the radio traffic channel is set up; and
   providing the second continuation message to the base station in preset units after the stored dialing information is sent wherein the second continuation message contains a parameter indicating whether additional dialed digits will be sent to the base station in subsequent origination continuation messages.

4. The method as claimed in claim 3, further comprising sending the second continuation message from the terminal to the base station within a preset first time and stopping sending the second continuation message upon expiration of the preset first time.

5. The method as claimed in claim 4, wherein the preset first time is a maximum time for the terminal to send said second continuation message upon entering an overlap sending substate of the terminal control on the radio traffic channel.

6. The method as claimed in claim 3, further comprising:
   sending a call proceeding message to indicate that a call establishment is started and no more call information will be accepted if it is determined that sufficient call information is received from the terminal; and
   stopping the sending of the second continuation message by the terminal in response to the call proceeding message.

7. The method as claimed in claim 3, wherein the preset unit is a dialed digit.

8. The method as claimed in claim 3, wherein the number dialed by the user after the traffic channel is set up is at least one calling party number.

9. The method of claim 3, wherein the second continuation message comprises dial information provided after transmitting the first continuation message to the base station and further comprises a MORE_FIELDS parameter to indicate whether an additional continuation message will be sent.

10. The method as claimed in claim 1, where the communication system is one of a CDMA communication system and a WLL-CDMA communication system.

11. The method as claimed in claim 1, wherein the terminal is one of a mobile station and a fixed subscriber unit.

12. The method as claimed in claim 1, further comprising:
    determining whether information received by the base station from the terminal contains complete information on the number dialed by the user during the radio traffic channel set-up; and
    carrying out an en-bloc address signaling method with the terminal if the information on the dialed number is complete.

13. The method as claimed in claim 1, wherein step (3) further comprises:
    (a1) transmitting a mobile origination message from the terminal to a base transceiver subsystem (BTS) in the base station informing a call start from the terminal to a base transceiver subsystem, (b1) transmitting a base station acknowledge order, informing that the message is well received, from the BTS in the base station to the terminal, (c1) assigning channel resources by the BTS in the base station and a base station controller (BSC), (d1) transmitting a null traffic signal informing from the BTS to the terminal that an assigned channel is available, (e1) transmitting a channel assignment message containing CDMA channel information, code information on a modulation, and frame offset information on synchronization information from the BTS to the terminal, (f1) setting up a traffic channel link between the BTS and BSC, (g1) transmitting a traffic channel preamble which is a preliminary signal from the terminal to the BTS, (h1) transmitting a base station acknowledge order which acknowledges the preamble from the BSC to the terminal, (i1) transmitting a terminal acknowledge order from the terminal to the BSC in response to the order, (j1) transmitting a service connect message informing that a call service is connected from the BSC to the terminal, (k1) transmitting a service connect complete message from the terminal to the BSC in response to the service connect message, and (l1) providing a ring back tone from the BSC to the terminal.

14. The method as claimed in claim 1, wherein step (1) further comprises monitoring on/off states of a hook switch on the terminal.

15. The method as claimed in claim 1, further comprising entering the terminal into an overlap sending substate upon setting up the radio traffic channel, and changing the terminal from an overlap sending substate to a conversation substate if no message is received from the base station within a preset time after the radio traffic channel is set up.

16. The method as claimed in claim 15, wherein the preset time is a maximum time in which to receive a message while in the overlap sending substate before the terminal transitions to a different substate.

17. The method as claimed in claim 1, wherein the radio traffic channel comprises:

a forward traffic channel for transmission of messages from the base station to the terminal; and a reverse traffic channel for transmission of messages from the terminal to the base station.

18. The method of claim 1, wherein the setup of the radio traffic channel is initiated by sending an origination message with a field "MORE_FIELDS" having a value of '1.'

19. The method of claim 1, further comprising:

transmitting a base station acknowledge order which acknowledges a preamble from the base station to the terminal; and transmitting a terminal acknowledge order from the terminal to the base station in response to the acknowledge order.

20. A method for controlling a call in a communication terminal, comprising:

monitoring a state of a hook switch;

generating a dial tone when the hook switch is in an off state and stopping generation of the dial tone when a first digit from a user's dialing is received;

conducting a radio traffic channel set up procedure with a base station and storing the digits from the dialing during the channel setting up;

transmitting a base station acknowledge order which acknowledges a preamble from the base station to the terminal;

transmitting a terminal acknowledge order from the terminal to the base station in response to the base station acknowledge order; and forming an origination continuation message out of the stored digits and transmitting the origination continuation message to the base station, wherein the origination continuation message comprises a NUM_FIELDS parameter indicating a number of dialed digits in the continuation message, a CHARi parameter indicating a dialed digit or character, and a MORE_FIELDS parameter indicating whether additional dialed digits will be sent in a subsequent origination continuation message.

21. The method as claimed in claim 20, further comprising:

forming at least one subsequent origination continuation message identical to a form of the origination continuation message in preset units in an order of reception out of digits dialed by the user after completion of the traffic channel set up; and transmitting the at least one subsequent formed message to the base station in the preset units.

22. The method as claimed in claim 20, wherein the continuation message comprises at least one party calling number.

23. The method as claimed in claim 20, wherein the communication terminal is one of a mobile station and a fixed subscriber unit (FSU).

24. A communication terminal, comprising:

a hook switch;

a hook switch monitoring section, coupled to monitor a state of the hook switch;

a controller, coupled to receive a state signal from the hook switch monitoring section, and at least one input signal and provide control signals in response to received signals;

a dial tone generator, coupled to receive a first control signal from the controller and generate a dial tone when the hook switch is in a first state, and to cease generating the dial tone when the first control signal indicates that an input key has been dialed;

a memory, coupled to receive and store dialing information in accordance with a second control signal received from the controller;

a message build up section coupled to receive and build up an origination continuation message in a preset form out of the dialing information stored in the memory under the control of the controller, wherein the origination continuation message comprises a NUM_ FIELDS parameter indicating a number of dialed digits in the continuation message, a CHARi parameter indicating a dialed digit or character, and a MORE_ FIELDS parameter indicting whether additional dialed digits will be sent in a subsequent origination continuation message."

a message transmission section configured to transmit the origination continuation message to a base station after a communication link is established with the base station and a base station acknowledge order acknowledging a preamble is received from the base station; and a timer, to provide a time limit to the controller, the time limit being in transmission of the message to the base station, message.

25. A method of controlling a call in a communication system, comprising:

monitoring a state of a hook switch;

generating a dial tone when the hook switch is in an off state and stopping generation of the dial tone when a first digit from a user's dialing is received;

setting up a radio traffic channel based on a prescribed protocol between the terminal and a base station;

storing a plurality of digits, including the first digit, received from the user's dialing in a memory during the radio traffic channel set-up;

forming a continuation message from the stored plurality of digits and transmitting the continuation message to the base station when the radio traffic channel is set-up; and sending at least one subsequent continuation message including additional digits dialed after the radio traffic channel is set-up, until a call proceeding message is received from the base station, wherein the call proceeding message is sent from the base station when one of the continuation message and the at least one subsequent continuation message comprises a MORE_FIELD value of 0.

26. The method of claim 25, wherein the call proceeding message is sent from the base station when the base station determines that one of the continuation message and the subsequent continuation message contains sufficient information to establish a call.

27. The of claim 25, wherein the base station discards any additional digits dialed after the call proceeding message is received.

28. The method of claim 25, further comprising receiving a base station acknowledge order which acknowledges a preamble from by the terminal, and transmitting a terminal acknowledge order to the base station in response to the base station acknowledge order.

29. The method of claim 25, wherein each subsequent continuation message comprises an additional dialed digit.

* * * * *